(12) United States Patent
Yamashita et al.

(10) Patent No.: US 11,418,745 B2
(45) Date of Patent: Aug. 16, 2022

(54) IMAGING APPARATUS, IMAGING SYSTEM, MOVABLE OBJECT, AND METHOD FOR DRIVING IMAGING APPARATUS

(71) Applicant: CANON KABUSHIKI KAISHA, Tokyo (JP)

(72) Inventors: Takanori Yamashita, Tokyo (JP); Hajime Murai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/329,302

(22) Filed: May 25, 2021

(65) Prior Publication Data

US 2021/0377480 A1    Dec. 2, 2021

(30) Foreign Application Priority Data

May 29, 2020 (JP) .............................. JP2020-094025

(51) Int. Cl.
*H04N 5/374* (2011.01)
*H04N 5/378* (2011.01)

(52) U.S. Cl.
CPC ........... *H04N 5/3742* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 7,903,056 B2 | 3/2011 | Kawasaki | |
| 9,502,451 B2 | 11/2016 | Yamashita | |
| 9,653,498 B2 | 5/2017 | Yamashita | |
| 9,749,570 B2 | 8/2017 | Yamashita | |
| 10,051,223 B2 | 8/2018 | Yamashita | |
| 10,057,529 B2 | 8/2018 | Saito | |
| 10,778,920 B2 | 9/2020 | Yamashita | |
| 11,070,753 B2 | 7/2021 | Yamashita | |
| 2016/0301886 A1 | 10/2016 | Muto | |
| 2017/0244422 A1 | 8/2017 | Hashimoto | |
| 2019/0379850 A1 | 12/2019 | Shinohara | |
| 2020/0275037 A1* | 8/2020 | Fukuhara | H04N 5/378 |
| 2020/0374481 A1 | 11/2020 | Yamashita | |
| 2021/0250532 A1 | 8/2021 | Akiyama | |

FOREIGN PATENT DOCUMENTS

| | | |
|---|---|---|
| JP | 2011-24109 A | 2/2011 |
| JP | 2616-76997 A | 5/2016 |
| JP | 2016-201649 A | 12/2016 |

* cited by examiner

*Primary Examiner* — Mark T Monk
(74) *Attorney, Agent, or Firm* — Venable LLP

(57) ABSTRACT

An imaging apparatus including a ramp voltage generation circuit having a first period for outputting an offset voltage that sets a reference voltage for the comparator circuit, and a second period for outputting a reference voltage having a slope-shaped voltage waveform that varies with time, wherein the generation circuit has a first drive state in which a voltage change amount per unit time of the reference voltage in the second period is a first voltage amount, and a second drive state in which the voltage change amount per unit time of the reference voltage in the second period is a second voltage amount that is less than the first voltage amount, and wherein the offset voltage in the second drive state is less than a value obtained by multiplying the offset voltage in the first drive state by a ratio of the second voltage amount to the first voltage amount.

14 Claims, 8 Drawing Sheets

IMAGING APPARATUS, IMAGING SYSTEM, MOVABLE OBJECT, AND METHOD FOR DRIVING IMAGING APPARATUS

BACKGROUND OF THE INVENTION

Field of the Invention

The present disclosure relates to an imaging apparatus, an imaging system, a movable object, and a method for driving an imaging apparatus.

Description of the Related Art

An imaging apparatus is known that removes noise signals by reading out noise signals (hereinafter referred to as N-signals) and pixel signals corresponding to the photoelectric conversion amounts including the noise signals (hereinafter referred to as S signals) and reading out the difference signals as image signals.

Japanese Patent Application Publication No. 2011-24109 describes a drive method in which, of the analog signals read from pixels and amplified, an N-signal and an S signal are compared separately in time with a time-varying ramp signal having a slope-shaped waveform. It also describes a drive method in which the counter starts counting up simultaneously with a temporal change of the ramp signal, and the A/D conversion is performed based on the counter value obtained when the ramp signal and the analog signal become equal.

The ramp signal to be compared with the N-signal has a ramp signal voltage range so that the A/D conversion can be performed taking into account the voltage variations among columns or the voltage fluctuation of N-signals. In addition, the A/D conversion gain can be changed by uniformly changing the voltage change amount per unit time of the ramp signal in the same manner for the N-signal and the S signal. That is, the ramp signal voltage range changes according to the A/D conversion gain.

Specifically, when the A/D conversion gain is increased according to the ramp signal, the ramp signal voltage range becomes smaller. Consequently, the voltage variations among columns or the voltage fluctuation of N-signals can be greater than the ramp signal voltage range. This may hinder appropriate comparison between the ramp signal and the N-signal, causing the A/D conversion to fail to give a correct value. That is, image degradation, such as vertical lines and graininess, can result.

If the time during which the ramp signal varies with time is extended to increase the ramp signal voltage range, with the voltage change amount per unit time remaining constant, one horizontal period becomes longer. In this case, high-speed readout cannot be performed.

SUMMARY OF THE INVENTION

It is an objective of the present disclosure to provide an imaging apparatus that is capable of high-speed readout of high-quality image signals.

In response to the above issue, the present disclosure achieves the above objective with the following configurations.

The first aspect of the disclosure is an imaging apparatus comprising: a pixel region in which pixel circuits configured to generate pixel signals by photoelectric conversion are arranged in a matrix; a ramp voltage generation circuit configured to output a reference voltage; and a comparator circuit that is arranged corresponding to a column of pixels and configured to output comparison result signals on the basis comparison between input signals corresponding to the pixel signals and the reference voltage output from the ramp voltage generation circuit, wherein the ramp voltage generation circuit has a first period in which the ramp voltage generation circuit outputs an offset voltage for setting a reference voltage for the comparator circuit, and a second period in which the ramp voltage generation circuit outputs a reference voltage having a slope-shaped voltage waveform that varies with time, wherein the ramp voltage generation circuit has a first drive state in which a voltage change amount per unit time of the reference voltage in the second period is a first voltage amount, and a second drive state in which the voltage change amount per unit time of the reference voltage in the second period is a second voltage amount that is less than the first voltage amount, and wherein the offset voltage in the second drive state is less than a value obtained by multiplying the offset voltage in the first drive state by a ratio of the second voltage amount to the first voltage amount.

The second aspect of the disclosure is a method for driving an imaging apparatus including: a pixel region in which a plurality of pixel circuits configured to generate pixel signals by photoelectric conversion are arranged in a matrix; a ramp voltage generation circuit configured to output a reference voltage; and a plurality of comparator circuits arranged corresponding to columns of pixels, the method comprising the steps of: setting a voltage change amount per unit time of a reference voltage that is output by the ramp voltage generation circuit and has a slope-shaped voltage waveform; outputting, by the ramp voltage generation circuit, an offset voltage to the comparator circuits and setting, by the comparator circuits, a reference voltage on the basis of the offset voltage; and outputting, by the ramp voltage generation circuit, a reference voltage having a slope-shaped voltage waveform that varies with time to the comparator circuits, and outputting, by the comparator circuits, comparison result signals on the basis of comparison between input signals corresponding to the pixel signals and the reference voltage output from the ramp voltage generation circuit, wherein in a first drive state, the step of setting the voltage change amount includes setting the voltage change amount per unit time of the reference voltage to a first voltage amount, in a second drive state, the step of setting the voltage change amount includes setting the voltage change amount per unit time of the reference voltage to a second voltage amount that is less than the first voltage amount, and the offset voltage in the second drive state is less than a value obtained by multiplying the offset voltage in the first drive state by a ratio of the second voltage amount to the first voltage amount.

The present disclosure is able to provide an imaging apparatus that is capable of high-speed readout of high-quality image signals Further features of the present invention will become apparent from the following description of exemplary embodiments with reference to the attached drawings.

DESCRIPTION OF THE EMBODIMENTS

Figure 1:
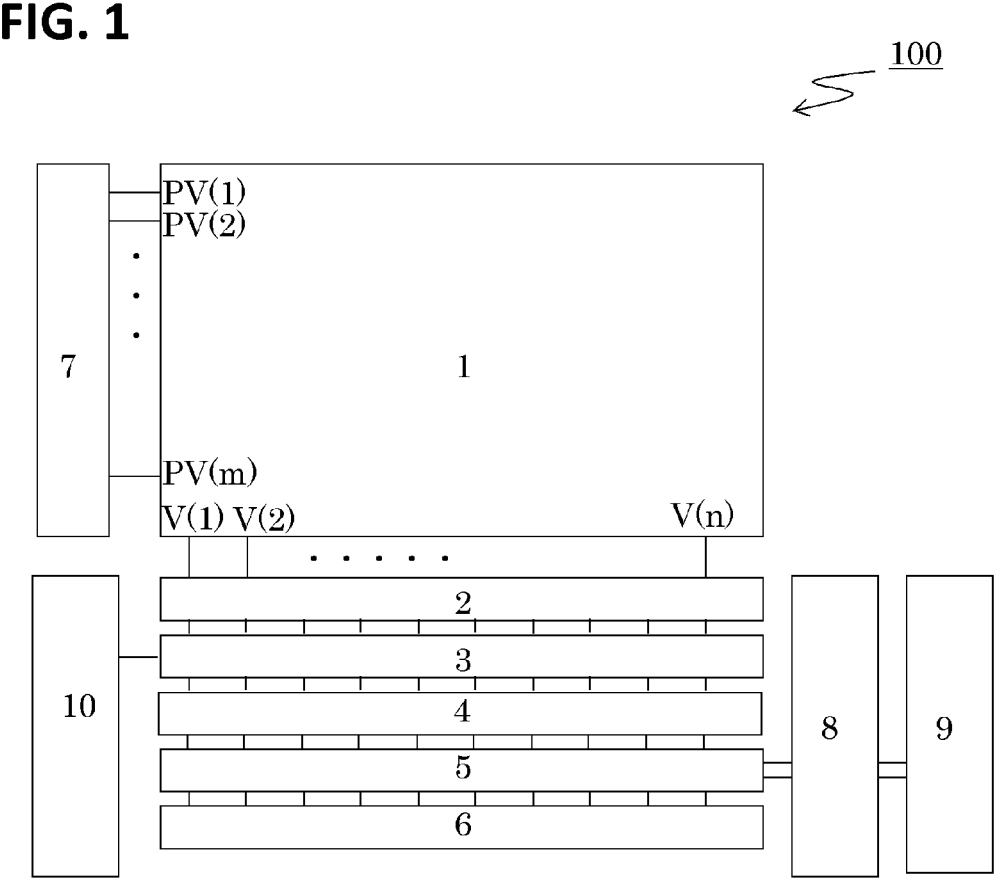
FIG. 1 is a block diagram of an imaging apparatus according to an embodiment.

Referring to the drawings, the best mode for carrying out an imaging apparatus according to the present disclosure is now described in detail.

First Embodiment

FIG. 1 shows a block diagram of a configuration of an imaging apparatus 100 according to the present embodiment. The imaging apparatus includes a pixel region 1, column amplifier circuits 2, column comparator circuits 3, column A/D conversion circuits 4, column memory circuits 5, a horizontal drive circuit 6, a vertical drive circuit 7, a data signal calculation circuit 8, an output circuit 9, and a ramp circuit 10.

The pixel region 1 includes a plurality of photoelectric conversion elements and pixel circuits arranged in a matrix. The pixel circuits arranged in the horizontal direction are controlled by row control signals PV(1), PV(m) (m is a natural number) supplied from the vertical drive circuit 7 for the respective rows. The pixel circuit generates and outputs a pixel signal based on the charge obtained by photoelectric conversion. The signals from the pixel circuits are read out through vertical readout lines V(1), . . . , V (n) (n is a natural number) and the amplifier circuits for the respective columns. Analog signals of noise signals (hereinafter referred to as N-signals) and pixel signals (hereinafter referred to as S signals) corresponding to photoelectric conversion amounts including noises are read out from the pixel circuits in a row-by-row manner. The pixel signals read through the vertical readout lines for the respective columns are input to the column amplifier circuits 2.

Each column amplifier circuit 2 amplifies the pixel signal read out from the column via the vertical readout line with a predetermined gain. The pixel signal amplified by the column amplifier circuit 2 is input to the column comparator circuit 3 as an input signal.

The column comparator circuit 3 compares the analog input signal input from the column amplifier circuit 2 with a ramp signal (reference voltage), which is input from the ramp circuit 10 and has a slope-shaped voltage waveform that varies with time. The column comparator circuit 3 outputs a comparison result signal based on the comparison between the input signal and the ramp signal. For example, the column comparator circuit 3 outputs L level when the voltage of the input signal is lower than the voltage of the ramp signal, and outputs H level when the voltage of the input signal is higher. The ramp signal is common to a plurality of columns and supplied from the ramp circuit 10. One column amplifier circuit 2 and one column comparator circuit 3 are provided for each pixel column, but the present disclosure is not limited to this example. For example, one column amplifier circuit 2 and one column comparator circuit 3 may be provided for a plurality of pixel columns.

Furthermore, a plurality of column amplifier circuits 2 and column comparator circuits 3 may be provided for one pixel column.

The column A/D conversion circuit 4 has a counter that counts up simultaneously with a temporal change of the ramp signal. Based on the result of comparison in the column comparator circuit 3, the column A/D conversion circuit 4 converts the counter value obtained at the time when the ramp signal and the analog signal become equal into a digital signal. Of the converted digital signals, N-signals and S signals are separately stored in the column memory circuit 5.

The digital signals stored in the column memory circuit 5 are sequentially read out to the data signal calculation circuit 8 row by row in response to the drive control signal from the horizontal drive circuit 6. The data signal calculation circuit 8 performs signal calculation processing, such as calculating the difference between S signals and N-signals based on the input digital signals, and outputs image signals to the outside through the output circuit 9.

The operation of each circuit described above is controlled based on control signals from a control circuit (not shown).

The present disclosure is not limited to the present embodiment. For example, the column amplifier circuit 2 may be omitted. In this case, the pixel signal from the pixel circuit is input to the column comparator circuit 3 as an input signal. Furthermore, the column memory circuit 5 may store the difference values between S signals and N-signals.

Figure 2:
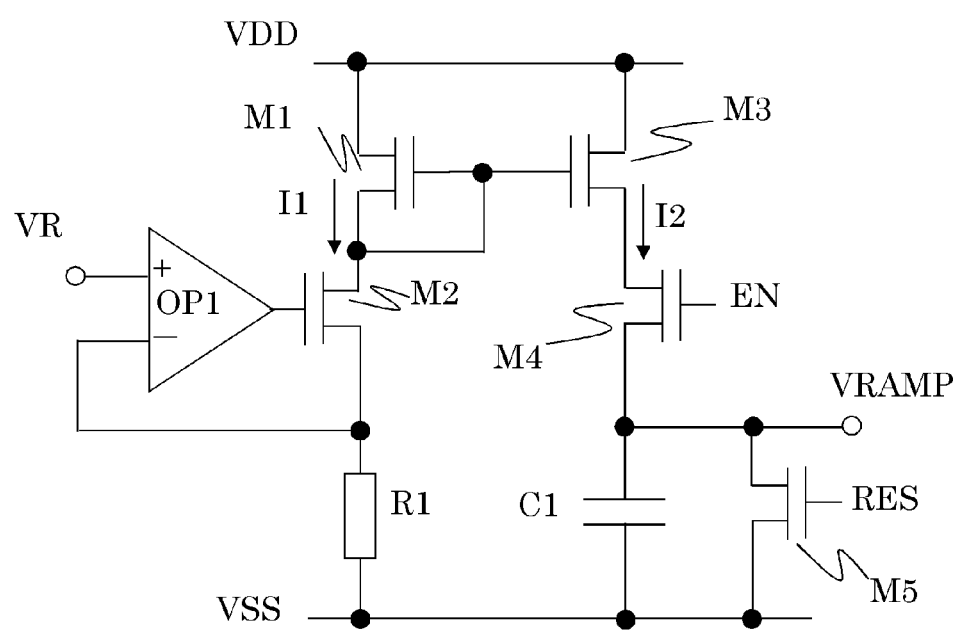
FIG. 2 is a circuit diagram of a ramp circuit according to an embodiment.

FIG. 2 shows the circuit configuration of the ramp circuit (ramp voltage generation circuit) 10.

An operational amplifier OP1 has a plus input terminal, to which an input voltage VR is input, and a minus input terminal, which is connected to a first terminal of a resistive element R1. The resistive element R1 has a second terminal connected to a power supply VSS. The first terminal of the resistive element R1 is connected to one of the source and drain terminals of a transistor M2, which has a gate terminal connected to the output terminal of the operational amplifier OP1. The other of the source and drain terminals of the transistor M2 is connected to the gate terminal and one of the source and drain terminals of a transistor M1. The other of the source and drain terminals of the transistor M1 is connected to a power supply VDD. The other of the source and drain terminals of the transistor M2 is also connected to the gate terminal of a transistor M3. One of the source and drain terminals of the transistor M3 is connected to the power supply VDD. The other of the source and drain terminals of the transistor M3 is connected to one of the source and drain terminals of a transistor M4 having a gate terminal controlled by an EN-signal. The other of the source and drain terminals of the transistor M4 is connected to a first terminal of a capacitor C1, which has a second terminal connected to the VSS power supply. The first terminal of the capacitor C1 is a ramp signal output VRAMP and is connected to one of the source and drain terminals of a transistor M5 having a gate terminal controlled by a RES-signal. The other of the source and drain terminals of the transistor M5 is connected to the power supply VSS.

A method for controlling the ramp circuit 10 is briefly described.

A current I1 corresponding to the input voltage VR and the resistive element R1 flows through the transistor M1, and the amount of current can be adjusted by adjusting the input voltage VR and the resistive element R1. That is, the current I1 can be represented by I1=VR/R1. The current I1 flowing through the transistor M1 is mirrored for the transistor M3, and a current I2 corresponding to the drive capability ratio of the transistor M1 and the transistor M3 (B=M3/M1) flows through the transistor M3. The current I2 can be represented by I2=B·I1=B·VR/R1.

The current I2 is supplied or stopped to the capacitor C1 in response to the EN-signal. When the current is supplied, the capacitor accumulates a charge and outputs a voltage corresponding to the accumulated charge as the ramp signal output VRAMP. The ramp signal output VRAMP is reset to the VSS power supply via the transistor M5 in response to the RES-signal.

That is, the ramp signal output VRAMP is adjusted by the amount of current I2 and the time during which the current is supplied, and has a slope-shaped voltage waveform that varies with time.

Figure 3:
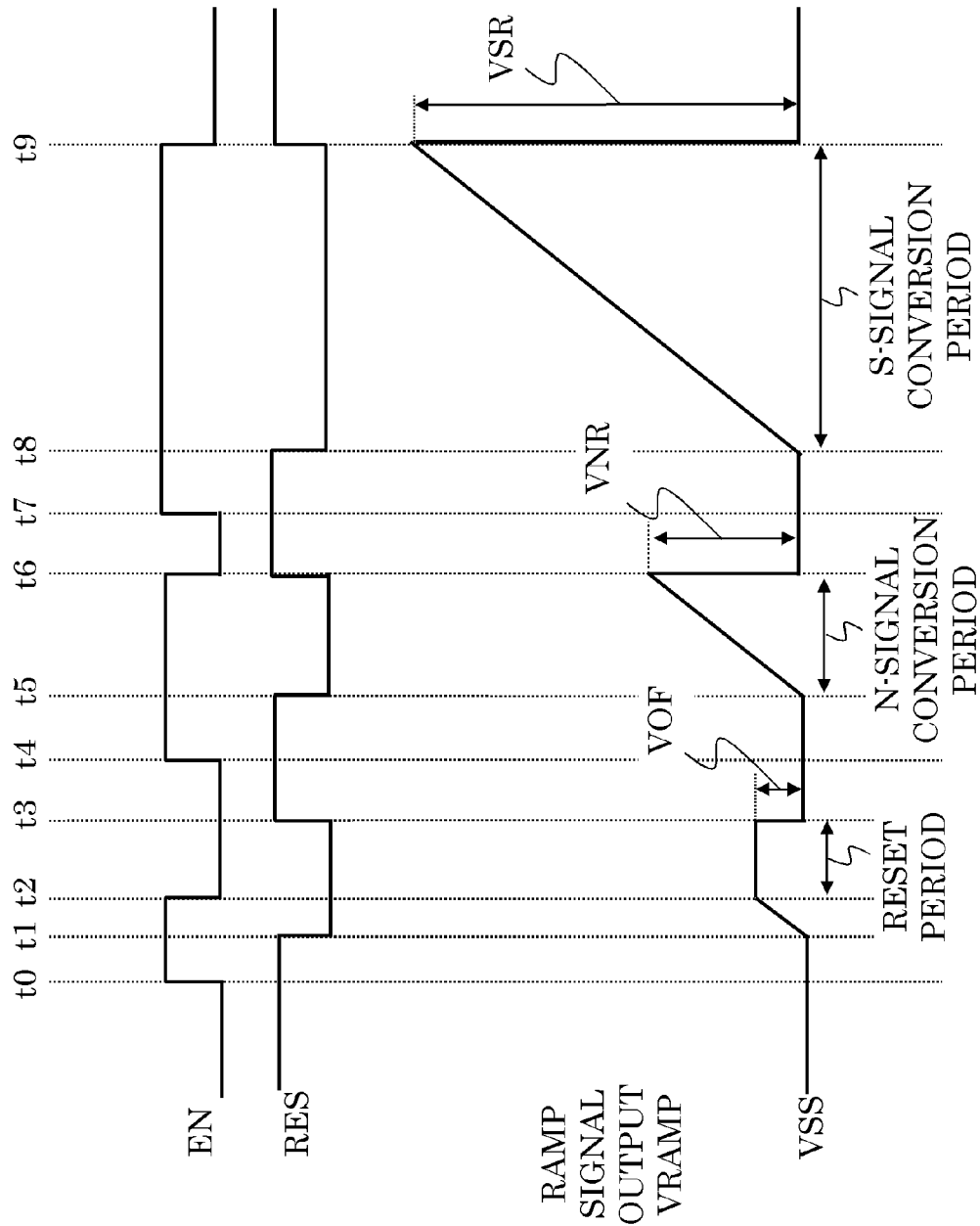
FIG. 3 is a drive timing chart of a ramp circuit according to a first embodiment.

FIG. 3 is a drive timing chart in one horizontal period. Referring to FIG. 3, the operation of the ramp circuit in an actual imaging apparatus is described in detail. The one horizontal period refers to a period in which signals are read out to the column circuits, such as the column amplifier circuits 2 and the column comparator circuits 3 in a row-by-row manner. For example, in one embodiment, the signals of all rows are read out by repeating one horizontal period for at least the number of rows.

Before time t0, the EN-signal is at L level and the transistor M4 is in the off state. The RES-signal is at H level and the transistor M5 is in the on state. That is, since both ends of the capacitor C1 are short-circuited and the current I2 is not supplied, the ramp signal output is the VSS voltage.

At time t0, the EN-signal changes from L level to H level, and the transistor M4 changes from the off state to the on state. The transistor M5 remains in the on state. That is, although the current I2 is supplied to the capacitor C1, both ends of the capacitor C1 remain short-circuited, so that the ramp signal output VRAMP remains as the VSS voltage.

At time t1, the RES-signal changes from H level to L level, and the transistor M5 changes from the on state to the off state. This opens both ends of the capacitor C1, so that a charge is accumulated in the capacitor C1 according to the current I2. Since the charge is accumulated in the capacitor C1 from time t1 to immediately before time t2, the time-varying voltage is output as the ramp signal output VRAMP.

At time t2, the EN-signal changes from H level to L level, and the transistor M4 changes from the on state to the off state. Accordingly, the supply of the current I2 to the capacitor C1 is stopped, and the voltage held in the capacitor C1 is output as the ramp signal output VRAMP from time t2 to immediately before time t3.

The period from time t2 to immediately before time t3 is a reset period for resetting the column comparator circuit 3, and the ramp signal output VRAMP in this period serves as a voltage for reference in the circuit operation of the column comparator circuit 3 after time t3. That is, during the reset period, the circuit operation is performed such that the ramp signal output (hereinafter, the ramp signal output during the reset period is referred to as an offset voltage VOF) is relatively equal to a reset voltage V0 of the signal output from the column amplifier circuit 2 during the same period. In other words, the reset period is a first period in which the ramp circuit 10 outputs an offset voltage VOF for setting a voltage for reference for the column comparator circuit 3.

At time t3, the RES-signal changes from L level to H level, and the transistor M5 changes from the off state to the on state. Both ends of the capacitor C1 are thus short-circuited, causing the ramp signal output VRAMP to be the VSS voltage.

After time t4, the circuit operation in which the EN-signal and the RES-signal are controlled is sequentially repeated in the same manner as for time t0 to time t3.

The period from time t5 to immediately before time t6 is an N-signal conversion period (second period) in which the N-signal and the slope-shaped ramp signal are compared. The period from time t8 to immediately before time t9 is an S signal conversion period (third period) in which the S signal and the slope-shaped ramp signal are compared. The N-signal conversion period is a period in which the column comparator circuit 3 compares the N-signal read from the pixel circuit with the ramp signal, and is also a period in which the ramp circuit 10 outputs a ramp signal (reference voltage) for this comparison operation. The S signal conversion period is a period in which the column comparator circuit 3 compares the S signal (the pixel signal corresponding to the photoelectric conversion amount including the N-signal) read from the pixel circuit with the ramp signal, and is also a period in which the ramp circuit 10 outputs a ramp signal (reference voltage) for this comparison operation.

Since the S signal corresponds to the photoelectric conversion amount and is greater than the N-signal, the ramp signal voltage range in the S signal conversion period needs to be greater than that in the N-signal conversion period. Specifically, the S signal conversion period is longer than the N-signal conversion period, and the ramp signal voltage range VSR for the S signal is greater than the ramp signal voltage range VNR for the N-signal.

The analog signal output from the column amplifier circuit 2 in the N-signal conversion period from time t5 to immediately before time t6 is defined as VN. The column comparator circuit 3 compares the voltage obtained by adding the offset voltage VOF to the difference between the VN voltage and the reset voltage V0 (VN−V0+VOF) with the ramp signal in the same period.

The analog signal output from the column amplifier circuit 2 in the S signal conversion period from time t8 to immediately before time t9 is defined as VS. The column comparator circuit 3 compares the voltage obtained by adding the offset voltage VOF to the difference between the VS voltage and the reset voltage V0 (VS−V0+VOF) with the ramp signal in the same period.

By setting the ramp signal output in the reset period as the offset voltage VOF, the column comparator circuit 3 can accurately perform comparison operation even if the output signal of the column amplifier circuit 2 becomes less than the reset voltage V0 during a signal conversion period due to voltage fluctuation, for example.

By repeating the circuit operation from time t0 to immediately before time t9, the N-signal and the S signal in the pixel region are sequentially read out in a row-by-row manner.

In the foregoing operation, the offset voltage VOF and the ramp signal voltage range can be controlled by changing the timing of the EN-signal and the RES-signal supplied by the control circuit. In addition, the gradient of the ramp voltage (the amount of change in the ramp voltage per unit time) can be controlled by the ramp control voltage supplied from the control circuit to the ramp circuit 10.

Figure 4A:
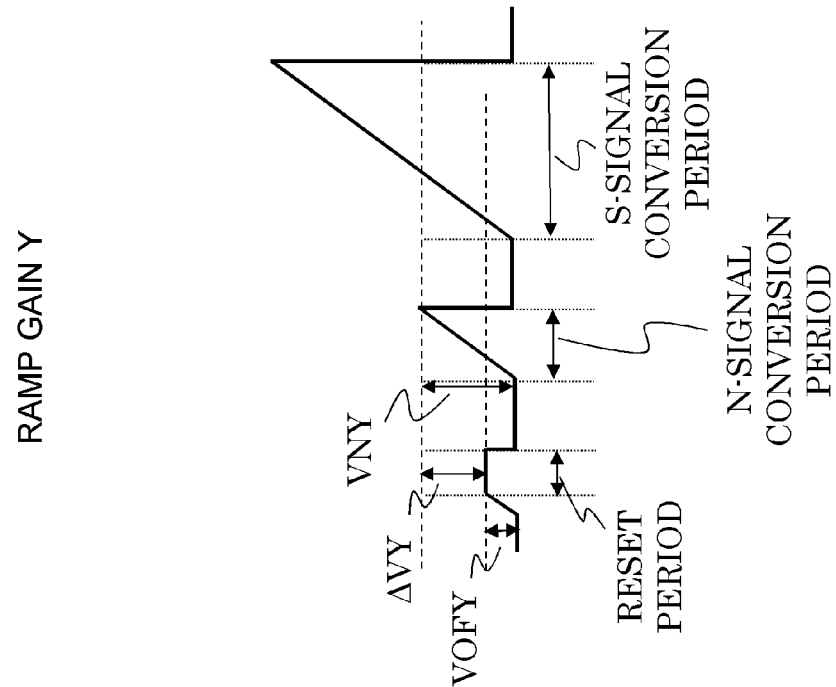
FIGS. 4A and 4B are schematic views illustrating a method for setting an offset voltage for each ramp gain.
Figure 4B:
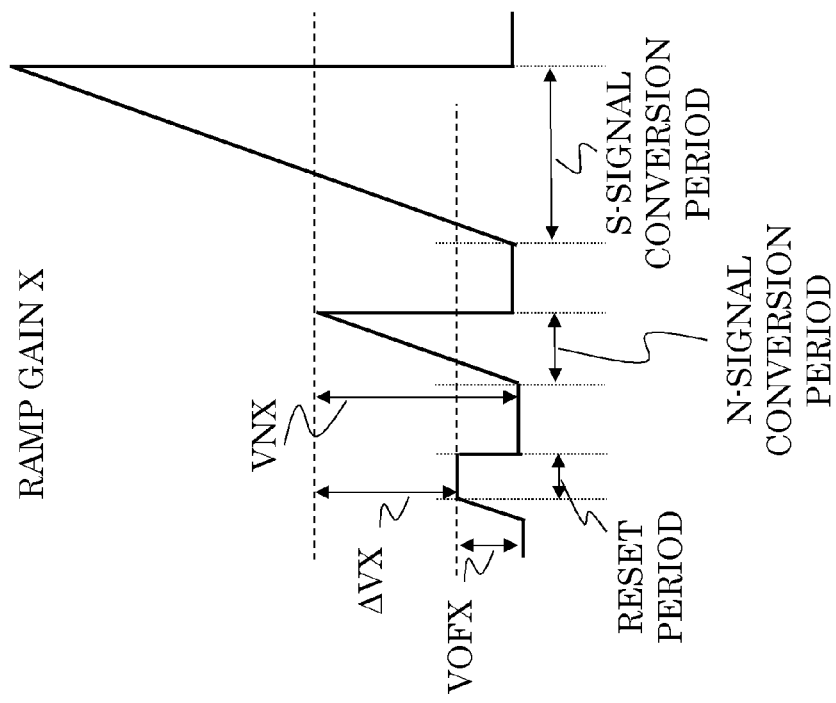

Referring to FIGS. 4A and 4B, a method for setting the ramp signal in the reset period and the N-signal conversion period in the above ramp circuit operation is described in detail.

Based on the ramp signal waveform shown in FIG. 3, FIGS. 4A and 4B show the ramp signal waveforms obtained when the ramp gain is a factor of X and a factor of Y, respectively. FIG. 4B shows a ramp signal waveform obtained by changing only the ramp gain, with the timing of the EN-signal and the RES-signal in the ramp circuit 10 remaining the same as in the state in FIG. 4A. The gain of a factor of Y is assumed to be of a greater value than the gain of a factor of X (Y>X). Also, it is assumed that the ramp gain of a factor of X is used as the base gain and the line gain is changed from a factor of X to a factor of Y.

The ramp gain is the gradient of the slope-shaped ramp voltage that varies with time (the amount of change in the ramp voltage per unit time) and corresponds to the A/D conversion gain. For example, when the ramp gain is increased, the gradient of the ramp voltage is reduced, and the A/D conversion gain is increased. As described above, the imaging apparatus of the present embodiment has a first drive state, in which the amount of change in the ramp voltage (reference voltage) per unit time is a first voltage amount, and a second drive state, in which the amount of change is a second voltage amount that is less than the first voltage amount. The first drive state corresponds to a state in which the ramp gain is a factor of X, and the second drive state corresponds to a state in which the ramp gain is a factor of Y (Y>X). The first and second drive states can be different in the A/D conversion gain.

As for the ramp signal with the ramp gain of a factor of X, the offset voltage in the reset period is VOFX, and the ramp signal voltage range in the N-signal conversion period is VNX as shown in FIG. 4A. The difference voltage between the ramp signal voltage range in the N-signal conversion period and the offset voltage is $\Delta VX$ ($\Delta VX=VNX-VOFX$).

As for the ramp signal with the ramp gain of a factor of Y, the offset voltage in the reset period is VOFY, and the ramp signal voltage range in the N-signal conversion period is VNY as shown in FIG. 4B. The difference voltage between the ramp signal voltage range in the N-signal conversion period and the offset voltage is $\Delta VY$ ($\Delta VY=VNY-VOFY$).

When the ramp gain is a factor of X, the ramp signal voltage range VNX in the N-signal conversion period needs to be sufficiently large taking into account the voltage variations among columns or the voltage fluctuation of N-signals. Specifically, when the voltage fluctuation amount of the voltage variations among columns or the voltage fluctuation of N-signals is $\Delta VN$, the difference voltage $\Delta VX$ is set to be greater than $\Delta VN$. This ensures the comparison operation between the N-signal and the ramp signal.

A situation is now described in which the setting of the ramp gain is changed from a factor of X to a factor of Y. When the ramp gain is changed to a factor of Y, the offset voltage VOFY is VOFY=X/Y·VOFX, the ramp signal voltage range VNY in the N-signal conversion period is VNY=X/Y·VNX, and the difference voltage $\Delta VY$ is $\Delta VY=X/Y\cdot\Delta VX$. That is, each voltage is uniformly multiplied by X/Y.

It should be noted here that the voltage variations among columns or the voltage fluctuation $\Delta VN$ of N-signals do not depend on the ramp gain. That is, with respect to the voltage fluctuation amount $\Delta VN$, the difference voltage $\Delta VX$ is set so as to satisfy $\Delta VX>\Delta VN$ when the ramp gain is a factor of X. In contrast, when the ramp gain is a factor of Y, the difference voltage $\Delta VY$ ($=X/Y\cdot\Delta VX$) is $\Delta VN>\Delta VY$, such that the voltage fluctuation $\Delta VN$ of the N-signal can be greater than the difference voltage $\Delta VY$. Consequently, when the ramp gain is a factor of Y, the comparison operation between the N-signal and the ramp signal cannot be performed correctly. This may result in failure of appropriate A/D conversion of the N-signal, causing the problem of image degradation, such as vertical streaks and graininess.

To solve this problem, one approach is to extend the N-signal conversion period and thus the N-signal voltage range VNY so that the difference voltage $\Delta VY$ becomes close to the difference voltage $\Delta VX$ in a state in which the ramp gain is a factor of X. This achieves $\Delta VY>\Delta VN$, allowing for the comparison operation between the N-signal and the ramp signal. However, the longer one horizontal period causes the readout speed for the ramp gain of X to differ from the readout speed for the ramp gain of Y. As such, this approach has another problem where the high-speed readout operation cannot be achieved.

The present embodiment discloses a drive method that operates at high speed and does not cause image degradation even if the ramp gain is changed. The drive method according to the present embodiment adjusts the offset voltage VOF of the ramp signal according to the ramp gain.

Specifically, the offset voltage VOFY with the ramp gain of a factor of Y is set to be less than the voltage obtained by multiplying the offset voltage VOFX with the ramp gain of a factor of X by the ramp gain ratio (X/Y) (VOFY<X/Y·VOFX). More specifically, the offset voltage VOFY is set such that the difference voltage $\Delta VY$ with the ramp gain of a factor of Y is as close as possible to the difference voltage $\Delta VX$ with the ramp gain of a factor of X.

In other words, the offset voltage VOFY in a state in which the ramp gain is a factor of Y (the second drive state) is set to be less than a value obtained by multiplying the offset voltage VOFX in a state in which the ramp gain is a factor of X (the first drive state) by the ramp gain ratio (X/Y). Here, the ramp gain ratio (X/Y) can be considered as the ratio of the voltage change amount per unit time of the reference voltage in the second drive state (the second voltage amount) to the voltage change amount per unit time of the reference voltage in the first drive state (the first voltage amount). The offset voltage VOFY in the second drive state is set such that the difference ($\Delta VX$) between the maximum value of the reference voltage in the N-signal conversion period and the offset voltage in the first drive state is substantially equal to this difference ($\Delta VY$) in the second drive state. Here, when $\Delta VX$ and $\Delta VY$ are "substantially equal", the difference between these values is sufficiently small in comparison to the voltage variations among columns or the voltage fluctuation ($\Delta VN$) of N-signals (typically not more than one-tenth).

To set the offset voltage VOFY with the ramp gain of a factor of Y to be less than the voltage obtained by multiplying the offset voltage VOFX with the ramp gain of a factor of X by the ramp gain ratio (X/Y), the time during which a charge is accumulated in the capacitor C1 of the ramp circuit 10 can be shortened. When the ramp gain is a factor of X, as shown in FIG. 3, a charge is accumulated in the capacitor C1 in the period from time t1 to time t2 during which both the EN-signal and the RES-signal are on. When the ramp gain is a factor of Y, the EN-signal is off at time t2' (t1<t2'<t2) to shorten the charge accumulation time of the capacitor C1. This allows the offset voltage VOFY to be less than the voltage obtained by multiplying the offset voltage VOFX by the ramp gain ratio (X/Y).

As such, the difference voltage $\Delta VY$ with the ramp gain of a factor of Y can be greater than the voltage fluctuation amount $\Delta VN$ of the N-signal ($\Delta VN<\Delta VY$). This enables the comparison operation between the N-signal and the ramp signal to be correctly performed also when the ramp gain is a factor of Y, thereby achieving the appropriate A/D conversion of the N-signal and avoiding image degradation. Also, high-speed readout operation is possible since one horizontal period is not extended. The present embodiment thus provides a high-quality imaging apparatus that operates fast without compromising the image quality.

Second Embodiment

Figure 5:
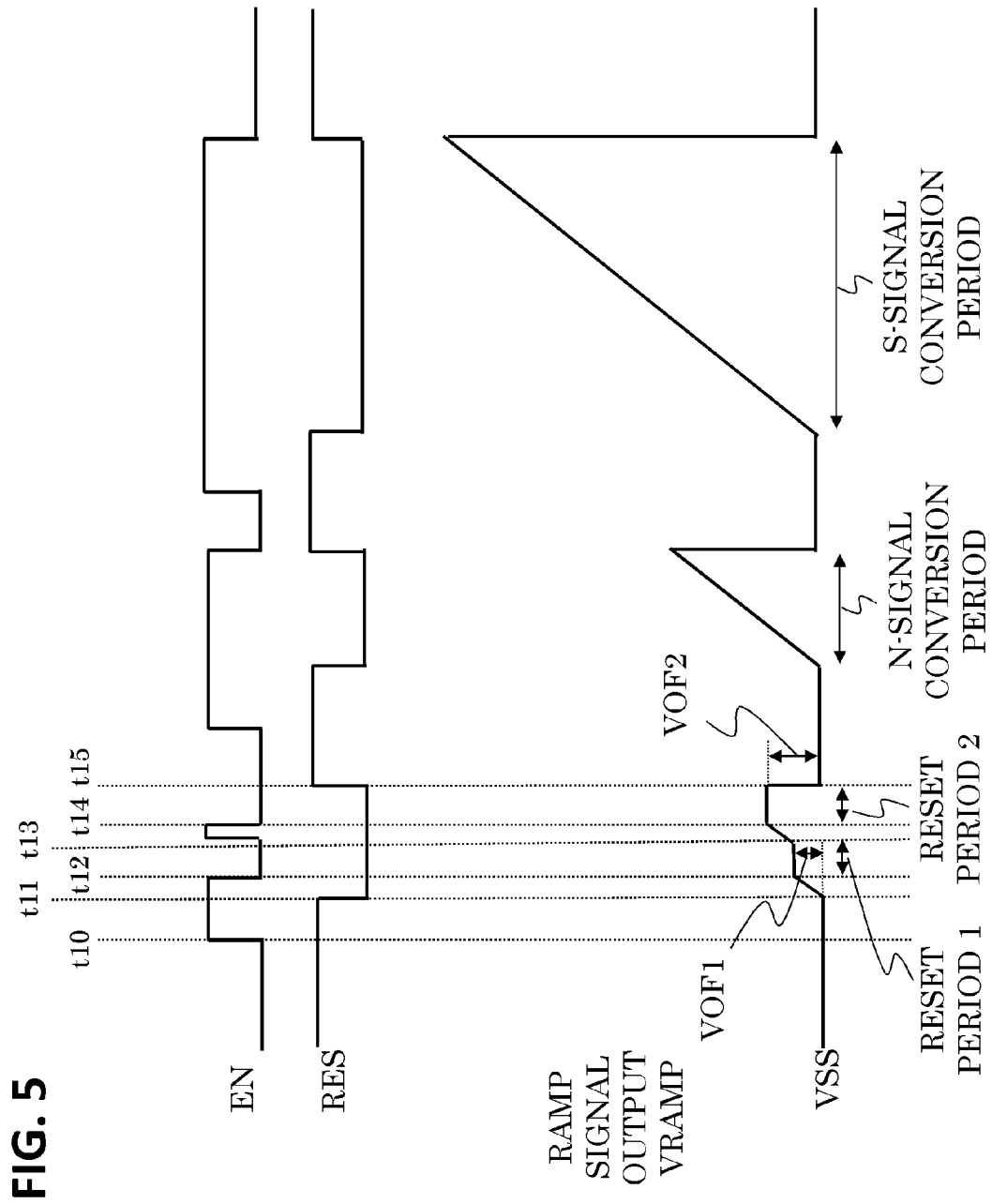
FIG. 5 is a drive timing chart of a ramp circuit according to a second embodiment.

FIG. 5 shows a drive timing chart of a ramp circuit 10 according to a second embodiment. The drive timing chart of FIG. 5 shows the drive timing in one horizontal period as in FIG. 3.

The second embodiment differs from the first embodiment in the method for driving the ramp circuit 10, but the apparatus configuration is the same as that of the first embodiment. The differences from the first embodiment are described below.

One feature of this embodiment is that two values, VOF1 for time t12 to immediately before time t13 and VOF2 for time t14 to immediately before time t15, are provided as offset voltages, so that separate reset periods and different offset voltages can be set for different columns. That is, the reset period includes a period in which a first offset voltage for setting a voltage for reference for the column comparator circuits of a first group is output and a period in which a second offset voltage for setting a voltage for reference for the column comparator circuits of a second group is output.

For example, the offset voltage of the ramp signal for the reset period for the column comparator circuits of even columns is VOF1, and the offset voltage of the ramp signal for the reset period for the column comparator circuits in odd columns is VOF2.

When the same offset voltage is used for the column comparator circuits of all columns, the comparison results are determined substantially at the same time in the column comparator circuits 3 of all columns. Although the comparison results are not determined at precisely the same time because of the variations among columns or the voltage fluctuation of the output signals (N-signals) of the column amplifier circuits 2 during the conversion of N-signals, the differences are insignificant, and the results are determined at substantially the same time. When the comparison results are determined in all columns at substantially the same time, the current simultaneously flows in the column comparator circuits 3 of all columns. The simultaneous current flow generates a large total current. Accordingly, the supply voltage may fluctuate and cause problems such as crosstalk that degrade the image quality.

In this regard, the present embodiment sets one of two values of offset voltages (the first offset voltage VOF1 and the second offset voltage VOF2) of the ramp signal according to the column. As a result, the comparison results of the column comparator circuits 3 during the conversion of the N-signals are substantially determined at two separate time points. The currents do not flow simultaneously in the column comparator circuits 3 of all columns. This limits the fluctuation of the supply voltage and drives the circuits in a manner that is unlikely to cause image degradation.

To change the ramp gain from a factor of X to a factor of Y, the present embodiment also needs to use the same configuration as the first embodiment. That is, the first and second offset voltages of the ramp signal in a state in which the ramp gain is a factor of Y are set to be less than the voltages obtained by multiplying the first and second offset voltages in a state in which the ramp gain is a factor of X by the ramp gain ratio (X/Y). Specifically, the second offset voltage in a state in which the ramp gain is a factor of Y is set such that the difference between the maximum value of the reference voltage in the N-signal conversion period and the second offset voltage in a state in which the ramp gain is a factor of X is substantially equal to that in a state in which the ramp gain is a factor of Y. Similarly, the first offset voltage in a state in which the ramp gain is a factor of Y may be set such that the difference between the maximum value of the reference voltage in the N-signal conversion period and the first offset voltage in a state in which the ramp gain is a factor of X is substantially equal to that in a state in which the ramp gain is a factor of Y.

This provides a high-quality imaging apparatus that operates fast without compromising the image quality.

The present embodiment groups the pixel columns into two groups of odd columns and even columns and sets different offset voltages for the groups. However, a criterion other than odd or even may be used to group the pixel columns. That is, the columns may be grouped in any manner as long as the pixel columns are grouped into a first column group and a second column group, and a different offset voltage is set for the column comparator circuits of each group. Furthermore, the pixel columns do not have to be grouped into two groups and may be grouped into at least three groups, and a different offset voltage may be set for the column comparator circuits of each group.

Third Embodiment

Figure 6:
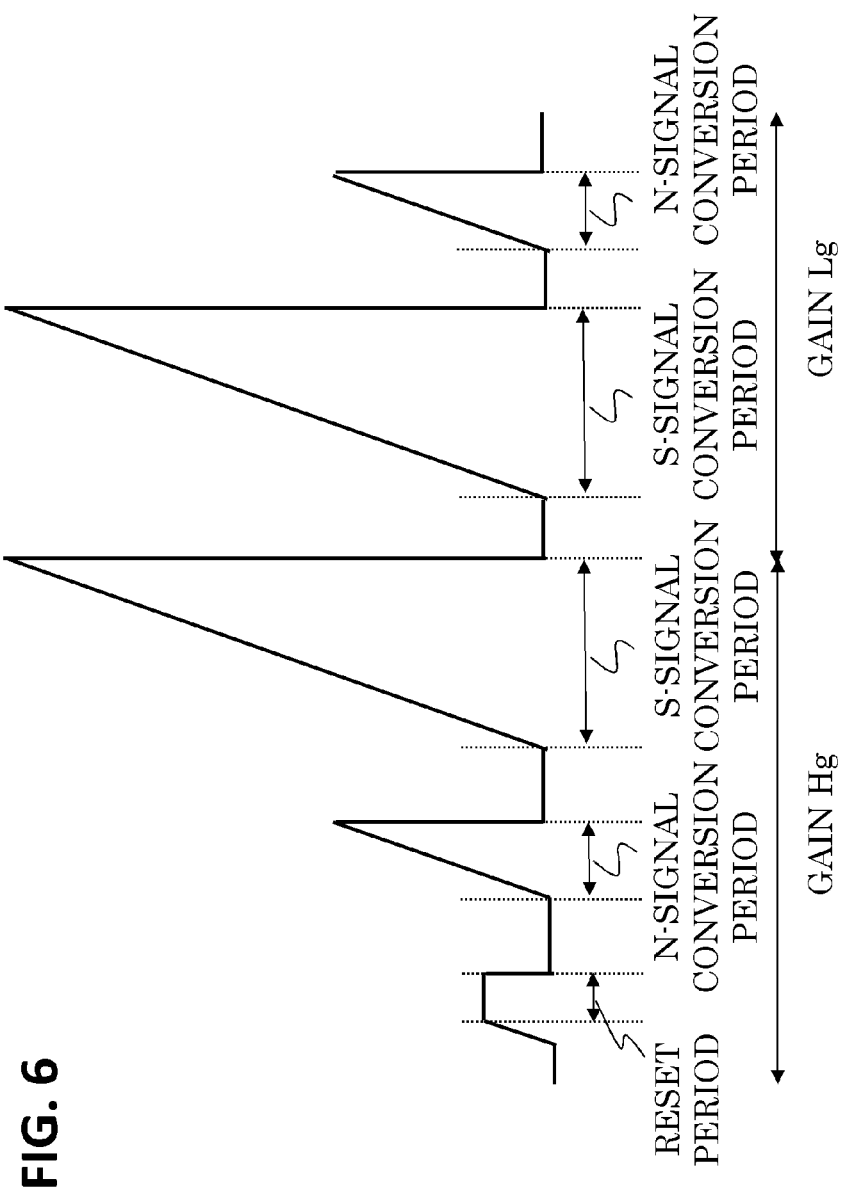
FIG. 6 is a drive timing chart of a ramp circuit according to a third embodiment.

FIG. 6 shows a drive timing chart of a ramp circuit 10 according to a third embodiment. The drive timing chart of FIG. 6 shows the drive timing in one horizontal period as in FIG. 3.

The third embodiment differs from the first and second embodiments in the drive method of the ramp circuit 10. The differences from the first embodiment are described below.

One feature of this embodiment is that analog signals read from the pixel circuits are read out by the column amplifier circuits 2 with two different gains, high gain Hg and low gain Lg. A low-brightness pixel signal is read with the high gain Hg, and a high-brightness pixel signal is read with the low gain Lg. The data signal calculation circuit 8 or an external circuit of the imaging apparatus performs image synthesis to read out an image with a wider dynamic range.

To change the ramp gain from a factor of X to a factor of Y (Y>X), the present embodiment also uses the same configuration as the first embodiment. That is, the offset voltage of the ramp signal in a state in which the ramp gain is a factor of Y is set to be less than the voltage obtained by multiplying the offset voltage in a state in which the ramp gain is a factor of X by the ramp gain ratio (X/Y).

The present disclosure is not limited to the present embodiment, and the readout order from the column amplifier circuits 2, the readout order regarding the low gain Lg and the high gain Hg, and the readout order regarding the S signal conversion period and the N-signal conversion period may be modified for driving. In addition, at least three different column amplifier gains may be used for readout.

Furthermore, the present disclosure is not limited to the above-described embodiments and may be embodied in other circuit configurations.

Fourth Embodiment

Figure 7:
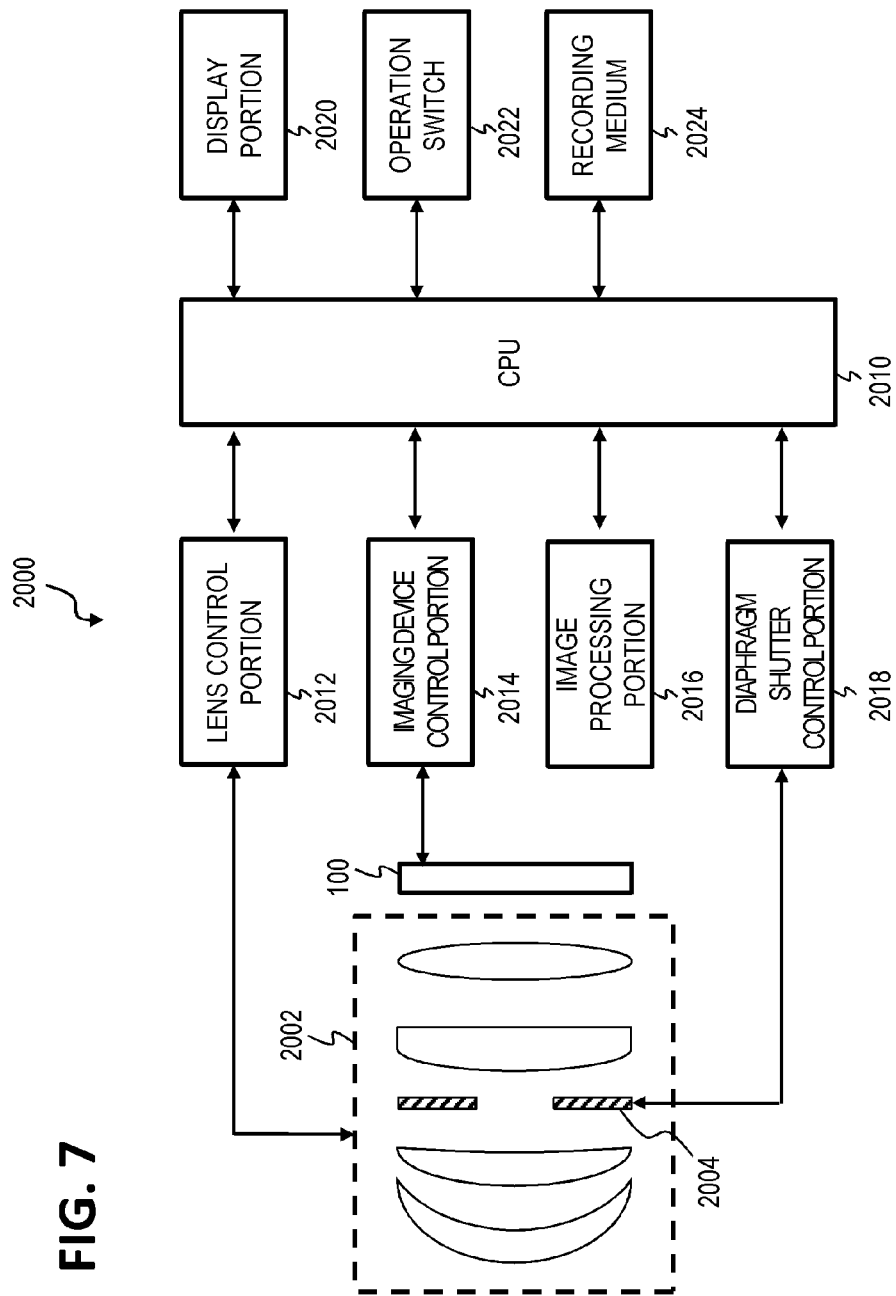
FIG. 7 is a diagram showing a configuration example of an imaging system according to a fourth embodiment.

An imaging system according to a fourth embodiment of the present invention will be explained with reference to FIG. 7. FIG. 7 is a block diagram of a schematic configuration of an imaging system according to this embodiment.

The solid-state imaging devices (photoelectric conversion devices) described in the above first to third embodiments may apply to various imaging systems. Applicable imaging systems may include, but are not limited to, various types of equipment such as a digital still camera, a digital camcorder, a monitor camera, a copying machine, a facsimile, a mobile phone, an in-vehicle camera, an observation satellite, a medical camera, or the like. The imaging systems may also include a camera module including an optical system such as a lens and a solid-state imaging device (photoelectric conversion device). FIG. 7 is a block diagram of a digital still camera as an example of those imaging systems.

FIG. 7 shows an imaging system 2000, which includes an imaging device 100, an imaging optical system 2002, a CPU 2010, a lens control portion 2012, an imaging device control portion 2014, an image processing portion 2016, and a diaphragm shutter control portion 2018. The imaging system 2000 also includes a display portion 2020, an operation switch 2022, and a recording medium 2024.

The imaging optical system 2002 is an optical system for forming an optical image of the subject, and includes a lens group, a diaphragm 2004, or the like. The diaphragm 2004 has a function of adjusting light intensity during photography by adjusting its opening size. The diaphragm 2004 also functions as an exposure time adjustment shutter during still image photography. The lens group and the diaphragm 2004 are held movable forward and backward in the optical axis direction. These linked operations may provide a scaling function (zoom function) and a focus adjustment function. The imaging optical system 2002 may be integrated into the imaging system or may be an imaging lens mountable to the imaging system.

The imaging device 100 is disposed such that its imaging plane is positioned in the image space of the imaging optical system 2002. The imaging device 100 is one of the solid-state imaging devices (photoelectric conversion devices) explained in the first to third embodiments. The imaging device 100 includes a CMOS sensor (pixel portion) and its peripheral circuits (peripheral circuit area). The imaging device 100 includes a plurality of pixels arranged in two dimensions, each pixel including a photoelectric conversion portion. These pixels are provided with color filters to form a two-dimensional single-plate color sensor. The imaging device 100 may photoelectrically convert a subject image imaged by the imaging optical system 2002 for output as an image signal and/or a focus detection signal.

The lens control portion 2012 is to control the forward and backward driving of the lens group in the imaging optical system 2002 to perform scaling operation and focus adjustment. The lens control portion 2012 includes a circuit and/or processing unit configured to achieve those functions. The diaphragm shutter control portion 2018 is to change the opening size of the diaphragm 2004 (for a variable diaphragm value) to adjust light intensity during photography, and is constituted of a circuit and/or processing unit configured to achieve those functions.

The CPU 2010 is a control unit in a camera responsible for various controls of the camera bod, and includes an operation portion, a ROM, a RAM, an A/D converter, a D/A converter, a communication interface circuit, or the like. The CPU 2010 controls the operation of each portion in the camera according to a computer program stored in a ROM or the like. The CPU 2010 performs a series of photography operations such as AF, imaging, image processing, and recording, including detection of the focus state (focus detection) of the imaging optical system 2002. The CPU 2010 also serves as a signal processing portion.

The imaging device control portion 2014 is to control the operation of the imaging device 100 and to A/D convert a signal output from the imaging device 100 and transmit the result to the CPU 2010, and includes a circuit and/or control unit configured to achieve those functions. The imaging device 100 may have the A/D conversion function. The image processing portion 2016 is a processing unit that subjects the A/D converted signal to processing such as y conversion and color interpolation to generate an image signal. The image processing portion 2016 includes a circuit and/or control unit configured to achieve those functions. The display portion 2020 is a display device such as a liquid crystal display device (LCD), and displays information related to a photography mode of the camera, a preview image before photography, a check image after photography, the focused state at the focus detection, or the like. The operation switch 2022 includes a power supply switch, a release (photography trigger) switch, a zoom operation switch, a photography mode selection switch, or the like. The recording medium 2024 is to record a photographed image or the like, and may be built in the imaging system or removable such as a memory card.

In this way, the imaging system 2000 applied with the imaging device 100 according to the first to third embodiments may provide a high performance imaging system.

Fifth Embodiment

Figure 8A:
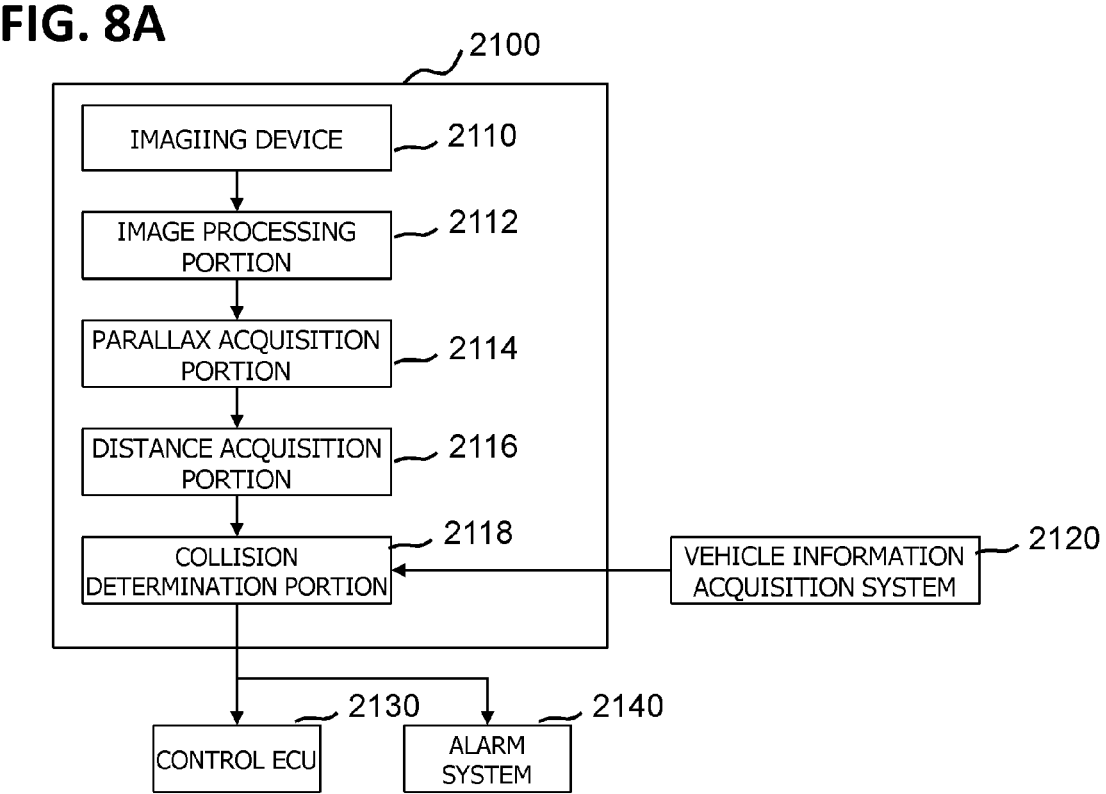
FIGS. 8A and 8B are diagrams showing a configuration example of an imaging system and a movable object according to a fifth embodiment.
Figure 8B:
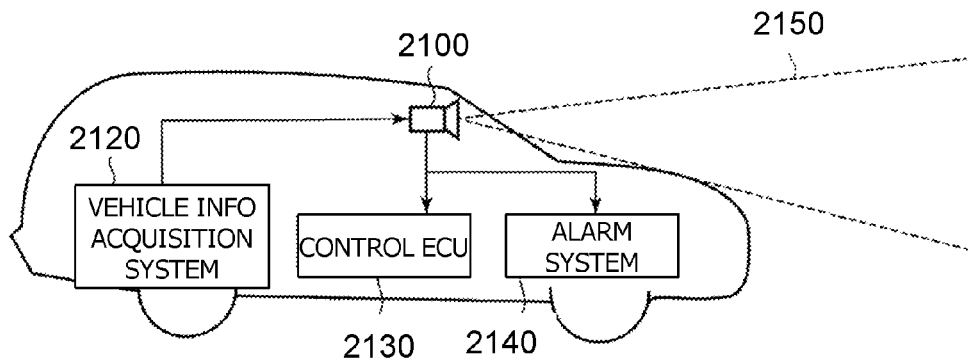

An imaging system and a mobile object according to a Fifth embodiment of the present invention will be explained with reference to FIGS. 8A and 8B. FIGS. 8A and 8B show configurations of the imaging system and mobile object according to this embodiment.

FIG. 8A shows an example of an imaging system 2100 associated with an in-vehicle camera. The imaging system 2100 has an imaging device 2110. The imaging device 2110 is any one of the solid-state imaging devices (photoelectric conversion devices) according to the above first to fourth embodiments. The imaging system 2100 has an image processing portion 2112 and a parallax acquisition portion 2114. The image processing portion 2112 is a processing unit that subjects a plurality of sets of image data acquired by the imaging device 2110 to image processing. The parallax acquisition portion 2114 is a processing unit that calculates parallax (a phase difference of a parallax image) from the sets of image data acquired by the imaging device 2110. The imaging system 2100 also includes a distance acquisition portion 2116, which is a processing unit that calculates the distance to the subject based on the calculated parallax. The imaging system 2100 also includes a collision determination portion 2118, which is a processing unit that determines a possibility of collision based on the calculated distance. Here, the parallax acquisition portion 2114 and the distance acquisition portion 2116 are examples of information acquiring means that acquires information such as distance information to the subject. In other words, the distance information is information related to parallax, defocus amount, the distance to the subject, or the like. The collision determination portion 2118 may determine a possibility of collision using any of the distance information. The above processing unit may be provided by specially designed hardware or may be provided by general hardware that performs operation based on a software module. In addition, the processing unit may be provided by a Field Programmable Gate Array (FPGA), an Application Specific Integrated Circuit (ASIC), or the like or may be provided by a combination thereof.

The imaging system 2100 is connected to a vehicle information acquisition system 2120, and may thus acquire vehicle information including a vehicle speed, a yaw rate, and a rudder angle. The imaging system 2100 also has a control ECU 2130 connected thereto. The ECU 2130 is a control unit that outputs a control signal for generating a braking force to the vehicle based on the determination by the collision determination portion 2118. In other words, the control ECU 2130 is an example of a mobile object control means that controls a mobile object based on the distance information. The imaging system 2100 is also connected to an alarm system 2140. The alarm system 2140 gives an alarm to the driver based on the determination by the collision determination portion 2118. For example, if the collision determination portion 2118 determines a high possibility of collision, the control ECU 2130 performs a vehicle control that avoids collision and reduces damage by braking, releasing the accelerator, limiting the engine output, or the like. The alarm system 2140 warns the user by sounding an alarm such as sound, displaying alarm information on a screen of a car navigation system or the like, giving vibration to a seatbelt and steering, or the like.

In this embodiment, the surroundings of the vehicle such as front or rear are imaged by the imaging system 2100. FIG. 8B shows the imaging system 2100 when imaging the front of the vehicle (imaging range 2150). The vehicle information acquisition system 2120 directs the imaging system 2100 to operate and perform imaging. Using the imaging devices according to the above first to fourth embodiments as the imaging device 2110, the imaging system 2100 in this embodiment may provide more improved ranging accuracy.

Although the above description shows an example control that prevents collision with other vehicles, the present invention may also apply to a control of autonomous driving following other vehicles, a control of autonomous driving preventing running over a traffic lane, or the like. In addition to a vehicle such as a car, the imaging system may also apply to, for example, a mobile object (transportation equipment) such as a vessel, an aircraft, or an industrial robot. The moving device in the mobile object (transportation equipment) is one of various types of drive sources, including an engine, a motor, a wheel, and a propeller. In addition to a mobile object, the imaging system may also apply to equipment, such as Intelligent Transport Systems (ITS), that commonly uses the object recognition.

(Other Embodiments) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-094025, filed on May 29, 2020, which is hereby incorporated by reference herein in its entirety.

What is claimed is:

1. An imaging apparatus comprising:
   a pixel region in which pixel circuits configured to generate pixel signals by photoelectric conversion are arranged in a matrix;
   a ramp voltage generation circuit configured to output a reference voltage; and
   a comparator circuit that is arranged corresponding to a column of pixels and configured to output comparison result signals on the basis comparison between input signals corresponding to the pixel signals and the reference voltage output from the ramp voltage generation circuit,
   wherein the ramp voltage generation circuit has a first period in which the ramp voltage generation circuit outputs an offset voltage for setting a reference voltage for the comparator circuit, and a second period in which the ramp voltage generation circuit outputs a reference voltage having a slope-shaped voltage waveform that varies with time,
   wherein the ramp voltage generation circuit has a first drive state in which a voltage change amount per unit time of the reference voltage in the second period is a first voltage amount, and a second drive state in which the voltage change amount per unit time of the reference voltage in the second period is a second voltage amount that is less than the first voltage amount, and
   wherein the offset voltage in the second drive state is less than a value obtained by multiplying the offset voltage in the first drive state by a ratio of the second voltage amount to the first voltage amount.

2. The imaging apparatus according to claim 1, wherein a difference between a maximum value of the reference voltage in the second period and the offset voltage in the first drive state is substantially equal to a difference between a maximum value of the reference voltage in the second period and the offset voltage in the second drive state.

3. The imaging apparatus according to claim 1, wherein in both of the first and second drive states, a difference between a maximum value of the reference voltage in the second period and the offset voltage is greater than a variation in the input signals when noise signals are read out from the pixel circuits.

4. The imaging apparatus according to claim 1, wherein the first period of the ramp voltage generation circuit includes a period in which the ramp voltage generation circuit outputs a first offset voltage for setting a reference voltage for comparator circuits of a first group and a period in which the ramp voltage generation circuit outputs a second offset voltage for setting a reference voltage for comparator circuits of a second group, with the second offset voltage being greater than the first offset voltage.

5. The imaging apparatus according to claim 2, wherein the first period of the ramp voltage generation circuit includes a period in which the ramp voltage generation circuit outputs a first offset voltage for setting a reference voltage for comparator circuits of a first group and a period in which the ramp voltage generation circuit outputs a second offset voltage for setting a reference voltage for comparator circuits of a second group, with the second offset voltage being greater than the first offset voltage.

6. The imaging apparatus according to claim 3, wherein the first period of the ramp voltage generation circuit includes a period in which the ramp voltage generation circuit outputs a first offset voltage for setting a reference voltage for comparator circuits of a first group and a period in which the ramp voltage generation circuit outputs a second offset voltage for setting a reference voltage for comparator circuits of a second group, with the second offset voltage being greater than the first offset voltage.

7. The imaging apparatus according to claim 1,
wherein a first offset voltage in the second drive state is less than a value obtained by multiplying a first offset voltage in the first drive state by a ratio of the second voltage amount to the first voltage amount, and
wherein a second offset voltage in the second drive state is less than a value obtained by multiplying a second offset voltage in the first drive state by a ratio of the second voltage amount to the first voltage amount.

8. The imaging apparatus according to claim 4, wherein a difference between a maximum value of the reference voltage in the second period and the second offset voltage in the first drive state is substantially equal to a difference between a maximum value of the reference voltage in the second period and the second offset voltage in the second drive state.

9. The imaging apparatus according to claim 1, further comprising an amplifier circuit that is arranged corresponding to a column of pixels and configured to amplify the pixel signals output from the pixel circuits,
wherein the pixel signals that have been amplified by the amplifier circuit are input to the comparator circuit as the input signals.

10. The imaging apparatus according to claim 9,
wherein the amplifier circuit amplifies the pixel signals output from the pixel circuits with a first gain and a second gain, and
wherein the comparator circuit outputs the comparison result signals by using a pixel signal amplified with the first gain and a pixel signal amplified with the second gain as the input signals.

11. The imaging apparatus according to claim 1,
wherein the second period is a period in which the comparator circuit outputs the comparison result signals on the basis of the input signals obtained when noise signals are read from the pixel circuits, and wherein the ramp voltage generation circuit further has a third period in which the comparator circuit outputs the comparison result signals on the basis of the input signals obtained when the pixel signals corresponding to photoelectric conversion amounts including the noise signals are read from the pixel circuits.

12. An imaging system comprising:
the imaging apparatus according to claim 1; and
a signal processing portion configured to process a signal output from the imaging apparatus.

13. A movable object comprising:
the imaging apparatus according to claim 1;
a distance information obtainment unit configured to obtain information on a distance to an object, from a signal output from the imaging apparatus; and
a control unit configured to control the movable object on the basis of the information on the distance.

14. A method for driving an imaging apparatus including:
a pixel region in which a plurality of pixel circuits configured to generate pixel signals by photoelectric conversion are arranged in a matrix;
a ramp voltage generation circuit configured to output a reference voltage; and
a plurality of comparator circuits arranged corresponding to columns of pixels, the method comprising the steps of:
setting a voltage change amount per unit time of a reference voltage that is output by the ramp voltage generation circuit and has a slope-shaped voltage waveform;
outputting, by the ramp voltage generation circuit, an offset voltage to the comparator circuits and setting, by the comparator circuits, a reference voltage on the basis of the offset voltage; and
outputting, by the ramp voltage generation circuit, a reference voltage having a slope-shaped voltage waveform that varies with time to the comparator circuits, and outputting, by the comparator circuits, comparison result signals on the basis of comparison between input signals corresponding to the pixel signals and the reference voltage output from the ramp voltage generation circuit, wherein
in a first drive state, the step of setting the voltage change amount includes setting the voltage change amount per unit time of the reference voltage to a first voltage amount,
in a second drive state, the step of setting the voltage change amount includes setting the voltage change amount per unit time of the reference voltage to a second voltage amount that is less than the first voltage amount, and
the offset voltage in the second drive state is less than a value obtained by multiplying the offset voltage in the first drive state by a ratio of the second voltage amount to the first voltage amount.

* * * * *